Dec. 20, 1938.  L. C. ROTTER  2,141,022
LUBRICATING APPARATUS
Filed April 17, 1937   4 Sheets-Sheet 1

Dec. 20, 1938.    L. C. ROTTER    2,141,022
LUBRICATING APPARATUS
Filed April 17, 1937    4 Sheets-Sheet 2

Dec. 20, 1938.   L. C. ROTTER   2,141,022
LUBRICATING APPARATUS
Filed April 17, 1937   4 Sheets-Sheet 3

Lutwin C. Rotter,
Inventor.
Delos G. Haynes
Attorney.

Dec. 20, 1938.  L. C. ROTTER  2,141,022
LUBRICATING APPARATUS
Filed April 17, 1937  4 Sheets-Sheet 4

Patented Dec. 20, 1938

2,141,022

UNITED STATES PATENT OFFICE 2,141,022

LUBRICATING APPARATUS

Lutwin C. Rotter, Glendale, Mo., assignor to Lincoln Engineering Company, St. Louis, Mo., a corporation of Missouri Application April 17, 1937, Serial No. 137,555

14 Claims. (Cl. 184—7)

This invention relates to lubricating apparatus, and with regard to certain more specific features, to lubricant injector apparatus.

Among the several objects of the invention may be noted the provision of a lubricating system for forcing lubricant to remotely located bearings in predetermined, measured charges; the provision of apparatus of the class described in which only a single lubricant line is used for delivery of the lubricant to the respective charging and injecting means; the provision of a single-line apparatus of the class described in which the possible failure of one charging and injecting element does not obstruct passage of lubricant to the others nor prevent their operation; the provision of apparatus of the class described which may be easily adapted and applied to machines and systems of machines of widely varying characteristics without the necessity of the use of special parts or designs. Other objects will be in part obvious and in part pointed out hereinafter.

The invention accordingly comprises the elements and combination of elements, features of construction, and arrangement of parts which will be exemplified in the structures hereinafter described, and the scope of the application of which will be indicated in the following claims.

In the accompanying drawings, in which are illustrated several of various possible embodiments of the invention:

Fig. 9 is a diagrammatic view showing an alternative system embodying the invention; and, Fig. 10 is a view similar to Fig. 9 showing the application of the invention to another alternative system.

Similar reference characters indicate corresponding parts throughout the several views of the drawings.

Figure 1:
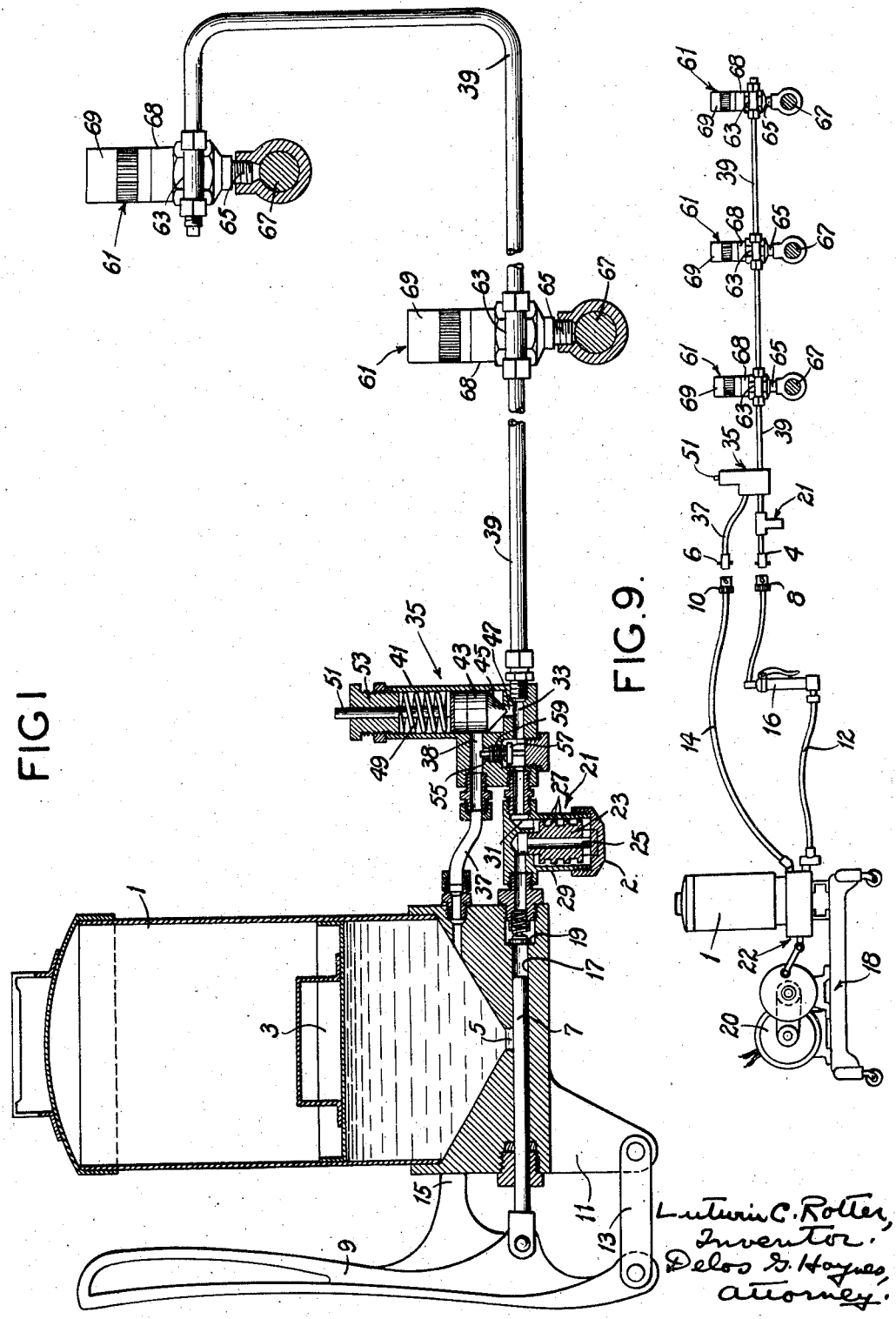
Fig. 1 is an illustration of a manually operable form of the invention being in part a vertical section showing certain pressure generating and control elements and in part an elevation showing piping and injector elements.

Referring now more particularly to Fig. 1, there is shown at numeral 1 a container for lubricant. While lubricant of any suitable variety may be used, I have found the viscous or semi-viscous type most suitable for the purpose. On the lubricant in the container 1 is used a follower piston 3 which, under atmospheric pressure, follows the lubricant as it is withdrawn from the container 1 and prevents cavitation.

At the lower end of the container 1 is an outlet 5 in conjunction with which operates a reciprocating plunger 7. The plunger 7 is under control of an oscillating handle 9 held to an extension 11 of the container 1 by means of a link 13. By oscillating the lever 9 from the position shown (which position is determined by the stop 15) and a rearward position, the plunger 7 is made to traverse the outlet 5 in its reciprocation.

Cylinder 17 in which the plunger operates is closed at an outlet by means of a check valve 19. Hence when the plunger 7 is withdrawn to the left, a partial vacuum draws the lubricant from the outlet 5 and when the plunger 7 is forced to the right, said lubricant is forced out past the check valve 19. The parts required for withdrawing lubricant from the container and pumping it past the check valve 19 will be referred to hereinafter generically as the pump.

At the outlet of the pump is a strainer 21 which consists of a shell 29 in which is a removable member 23 having an opening 25 down its center and a series of flanges 27 on its periphery. There is a clearance of a few thousandths of an inch between the edges of the flanges 27 and the shell 29, so that lubricant which flows out from the bottom end of the passages 25, in flowing upwardly past the wall 29 into an outlet 31, must traverse said small clearance. The small clearance traps foreign material to prevent its passage. From time to time the member 23 may be removed for cleaning by opening cap 2.

From the outlet 31 the lubricant flows to the transmission passage 33 of a device which will hereinafter be referred to generically as a relief valve 35. The relief valve 35 is used in connection with a by-pass 37 back to the container 1, but the lubricant normally may pass through the passage 33 and to a single distribution line 39.

The relief valve 35 comprises a cylinder 41 in which is a slidable piston 43 having a conical face 45 for seating at a reduced area on the edge of a relatively small passage 47 located between the passage 33 and the cylinder 41. The outlet 38 to the by-pass 37 is normally covered by said piston 43 but under certain conditions is uncovered. A spring 49 normally presses the piston downwardly, as shown in Fig. 1. A stem 51 which passes through a bearing 53 serves as a bearing and a tell-tale function.

An auxiliary communication 55 connects the transmission passage 33 with the by-pass 37 and in this communication is a valve 57 which is normally spring pressed toward passage 33 to open position. This is done by means of a spring 59.

A relatively high pressure is required in the passage 33 in order to open the port 47 (for example, 3000 lbs. per sq. in.). After the port once opens, a relatively lower pressure will maintain it open (for example, 100 lbs. per sq. in.). Thus relief is effected until the pressure drops to a value far below that required initially to open the port 47. The valve 57 is set to open at a pressure in passage 33 which is slightly higher than said lower pressure, so that before the valve 45 recloses, the valve 57 opens (for example, valve 57 may re-open at 105 lbs. per sq. in.).

The related functions of the relief valves 45, 57 and of the by-pass 37 to the container will be outlined hereinafter.

Figure 2:
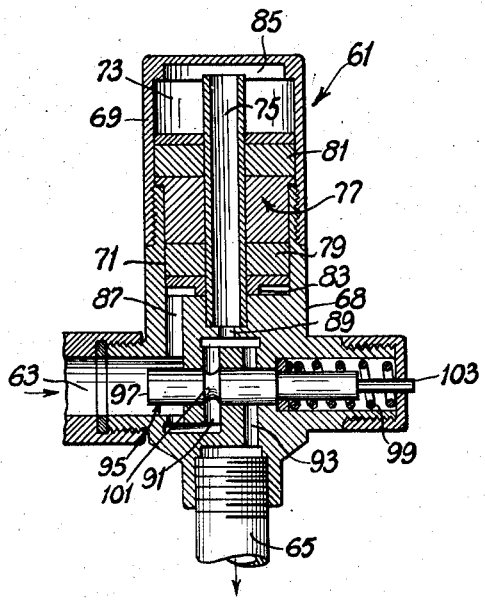
Fig. 2 is a vertical section of one of the injectors of Fig. 1 in charging position.
Figure 3:
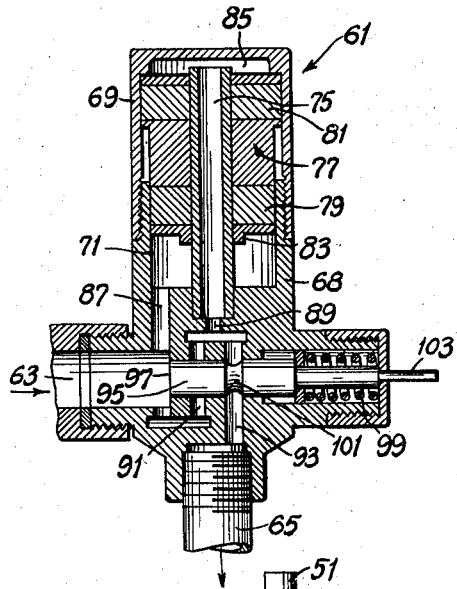
Fig. 3 is a view similar to Fig. 2 showing the injector in an alternative injecting position.

At numerals 61 are generally designated certain injector mechanisms. The details of these are shown in Figs. 2 and 3. Each of these mechanisms 61 has a pressure inlet 63 in communication with said single pipe 39, and an outlet 65 which is adapted, by means of a nipple or a pipe extension, to communicate with the bearing 67 to be lubricated. As many or as few of the injectors 61 may be used, depending upon the number of bearings to be lubricated. Each branches from the pipe 39 and none are in series therewith.

Each injector 61 comprises a body portion 68 from which extends a differential cylinder 69 having a smaller bore 71 and a connected larger bore 73. Axially of the cylinder 69 is a delivery tube 75 upon which slides a differential piston 77, having a portion 79 of small diameter fitting said small bore 71, and a portion 81 of larger diameter fitting said larger bore 73. The piston is slidable from the position shown in Fig. 2 to that shown in Fig. 3. An extension 83 provides clearance space below the piston when it is in its lower position, as shown in Fig. 2, and a recess 85 in the cylinder 69 provides a clearance space when the piston is at the upper end of its travel, as shown in Fig. 3.

It will be understood that the tube 75 passing through the piston 77 is to form a communication with the larger side of the piston, and that the particular form is merely for the sake of compactness, and that any communication between the space at the large end of the piston with the passages 91 and 93 would accomplish the same purpose. For example, said passage might comprise a pipe outside of the cylinder 69.

The body 68 has a port 87 which provides a communication from the inlet 63 to the bottom and small end of the piston 77. This communication 87 is always open.

There is also a communication 89 from the lower end of the transmission tube 75 which branches to form a passage 91 which leads to said inlet 63, and a second passage 93 which leads to the outlet 65.

A valve 95 traverses the passages 91 and 93 and has a face 97 exposed to pressure in the inlet 63. This valve is normally biased by means of a spring 99 so that a groove 101 therein normally opens the passage 91 while the passage 93 is closed. When the pressure is high enough against the face 97 of the valve 95, the spring 99 is compressed, thus pressing the groove 101 into position to open the passage 93, the passage 91 being at this time closed. The rear of the valve is also formed as a tell-tale 103.

Figure 4:
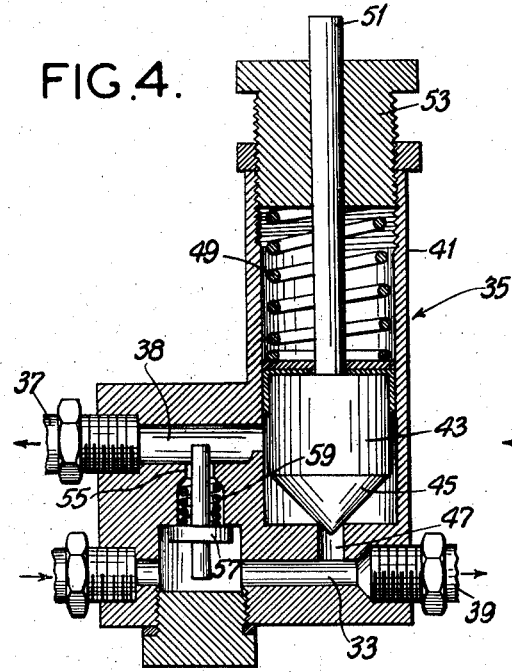
Fig. 4 is an enlarged section of a relief valve shown in Fig. 1 but indicating a pressure transmitting condition.
Figure 5:
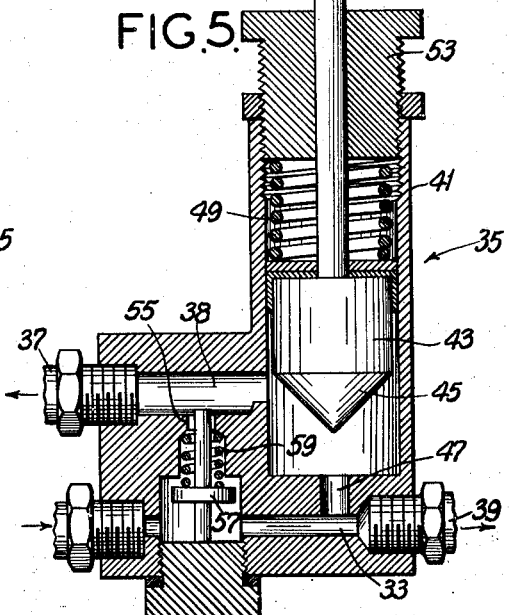
Fig. 5 is a view similar to Fig. 4 showing said relief valve in released position.

The operation of the apparatus of Figs. 1–5 is as follows, assuming the parts to be in the position shown in Figs. 1, 2 and 4, except that in the case of Fig. 3, the piston 77 is at the upper end of its stroke (as left by the previous cycle of operation) and ready to move into the position shown in Fig. 2.

The operator merely operates the handle 9, thereby pumping lubricant from the container 1 past the check valve 19, through the strainer 21, and to the line 39. Before pumping starts, the valve 57 is open as shown in Fig. 1, but promptly after pumping has started it is shut as shown in Fig. 4. As above described, a considerable pressure may be exerted on the small area of the conical valve portion 45 which covers the passage 47 before the piston 43 will be raised. During the part of the pumping period now to be described, it is closed as shown in Figs. 1 and 4. Thus pressure flows and builds up in the line 39 and is transmitted to the inlets 63 of the injector units 61.

Inasmuch as the valve 95 of each injector unit is at this time in the position shown in Fig. 2, the pressure may flow through passages 91, 89, transmission tube 75, and to the large upper end 81 of the piston 77 which at this time is at the upper end of the cylinder, due to having been left there after the completion of the previous cycle. At the same time pressure may flow through the port 87 to the small end 79 of said piston 77. Since however the small end has a smaller area than the large end, the piston is moved downwardly to the position shown in Fig. 2, thus causing a charging of lubricant into the space 73 above the piston 77. As the charging operation comes to an end, the abutment 83 strikes the lower end of the cylinder 69. Continued pumping at the handle 9 then increases the pressure until the reaction of spring 99 is overcome by the pressure on the face 97 of the valve 95. The valve 95 thus moves from the position shown in Fig. 2 to the position shown in Fig. 3. This causes the passage 93 to become opened as passage 91 closes, thereby communicating the charge in the chamber 73 with the outlet 65 by way of said transmission tube 75, port 89 and passage 93. The pressure passing through port 87 to the small end 79 of the piston 77 then forces the piston 77 upwardly from the position shown in Fig. 2 to the position shown in Fig. 3, thereby forcing a measured charge to the bearing in connection with the outlet 65. Motion of the tell-tale 103 indicates that the measured injection is taking place. This tell-tale is to check operation from time to time and may not be available to the sight of the operator, who may be located at a distance. He may therefore continue pumping, whereupon the pressure in the line 39 will rise, without any further activity on the part of the injector, the measured charge having been delivered. The pressure in the port 47 of the relief valve 35 finally becomes great enough that the piston 43 rises to uncover the by-pass, whereupon fluid flows back to the container 1. It will be seen that as soon as the port 47 is opened, the enlarged area of the entire cone 45 is exposed to the pressure, so that thereafter a lower pressure serves to hold the piston 43 clear of the port 38. Hence, even though the operator ceases to reciprocate the handle 9, and the pressure in line 39 drops (bleeds off), said piston will remain open as the lower pressure eventuates. The diameters of piston 43 and of the seat on the port 47 are so calculated with respect to the area 97 on each valve 95 that normally, before the port 47 shall have been closed, the spring 99 has returned valve 95 to the position shown in Fig. 2.

The purpose of the auxiliary valve 57 is to meet conditions wherein a relatively long line 39 is used which may have a relatively large amount of friction therein. Thus upon cessation of pumping of the handle 9 and bleeding of the line 39, the part of the line 39 adjacent the relief valve 35 only may bleed off promptly, while the remainder may lag in losing its relatively high pressure. This may result in the reclosure of the cone 45 over the port 47 before the distant injectors have been bled of pressure, in which event said injectors would not have their valves 95 return to proper position for refilling upon the next pumping action.

As soon as the port 47 is opened, there is a substantial balance of pressure on opposite sides of said valve 57 which causes it to re-open. It remains open due to balance of pressure as long as valve 45 is open. By the time the valve 45 reseats the valve 57 is held open by its own spring to take care of bleeding under lower pressure conditions than valve 45 is adapted to take care of, as under slow pressure loss in a long line with high friction. Of course, by the time that the pump is again started the valve 45 has closed and remains closed until relatively high pressure conditions are re-established. As these high-pressure conditions are re-established the valve 57 again shuts due to excess pressure in passage 33 which is greater than the pressure of spring 59. Thus while the valve formed by the piston 43 serves normally to bleed off the pressure, the valve 57 serves to bleed it off under lower pressure conditions than the valve 45 is capable of, as with slow leakage from a long line.

It will be seen that whenever a measuring operation is over, and the pressure builds up to force its way through the port 47, thereafter said port opens up wide, thereby quickly relieving the pressure. The relief of this pressure can be felt in the operation of the handle 9, and this constitutes a signal to the operator that all of the operative injectors 61 have functioned. The signal at the handle 9 is augmented by the visual signal at tell-tale 51. In order to determine that all injector valves are operating, it is necessary to take note of all tell-tales 103.

It will be understood that after pressure has been bled from the line 39, that the piston 77 remains in its upper position, as shown in Fig. 3, awaiting recharging and movement to the position shown in Fig. 2 upon subsequent pump operation. Of course, while piston 77 maintains its upper position, upon bleeding of the line 39, the valve 95 automatically returns to the Fig. 2 position under action of spring 99 and prior to return of the piston 77 from its Fig. 3 to its Fig. 2 position.

Figure 6:
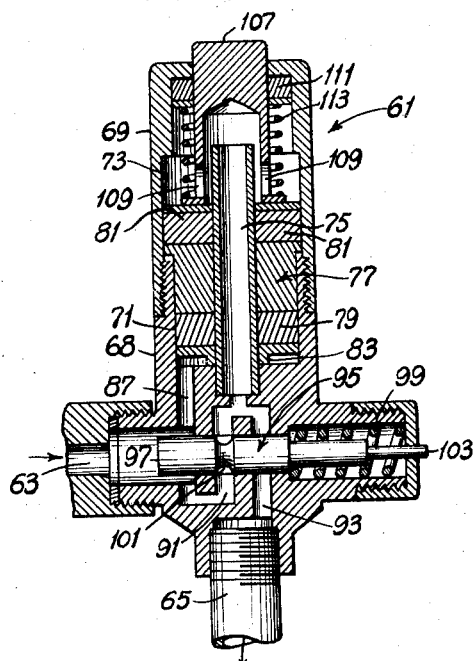
Fig. 6 is a vertical section of an alternative form of injector.

In Fig. 6 is shown a modified form of injector 61 wherein like numerals designate like parts. The difference between this form and the one shown in Figs. 2 and 3 is that besides the telltale 103, there is tell-tale 107 mounted upon the upper side of the piston 77. This tell-tale is hollow, having openings 109 so that pressure may reach throughout the area to the top of the piston, and so that lubricant may reach the transmission tube 75. The tell-tale 107 reaches through a packing 111 between which and the base of the tell-tale is a spring 113 for holding packing in proper position and for holding the indicator 107 against the piston 77. The spring 113 is not strong enough to have any appreciable action in discharging lubricant. It will be seen that this tell-tale indicates whether or not the piston is functioning, whereas the tell-tale 103 indicates whether the valve members are functioning.

In both forms of the invention shown in Figs. 2 and 6, it will be seen that the top 81 of the piston is formed as a separate piece from the main body of the piston. By unscrewing the cylinder 69, it is possible to place shims underneath the portions 81 and thus to adjust the predetermined charge or injection.

Figure 7:
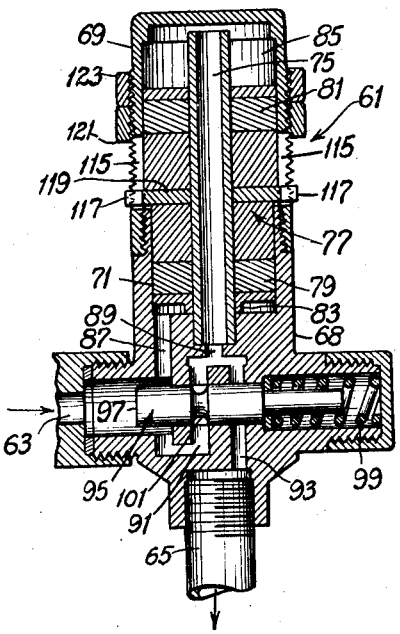
Fig. 7 is a view similar to Fig. 6 showing another form of injector.

In Fig. 7 is shown an adjusting means which requires no disassembly. In Fig. 7 like numerals indicate like parts. In this case the cylinder 69 is provided with opposite slots as shown at numerals 115 wherein are slidable lugs 117 forming extensions from a member 119 carried with the piston 77. The slots 115 are never uncovered by the piston 77. These lugs 117 function as telltales of the operation of the piston, and at the upper end of their travel they abut the lower side of an adjusting ring 121 which is threaded on the outside of said cylinder 69. A locking ring 123 serves to hold the adjustable ring 121 in a predetermined position. Inasmuch as the adjusting ring 121 limits the stroke of the piston, it will be seen that the charge is predeterminately adjustable.

It will be appreciated that the timing of the operation of the handle 9 may be according to any schedule desired as once every hour or twice a day, or otherwise. On the other hand, the timing may be predetermined automatically, and this feature is shown in Fig. 8.

Figure 8:
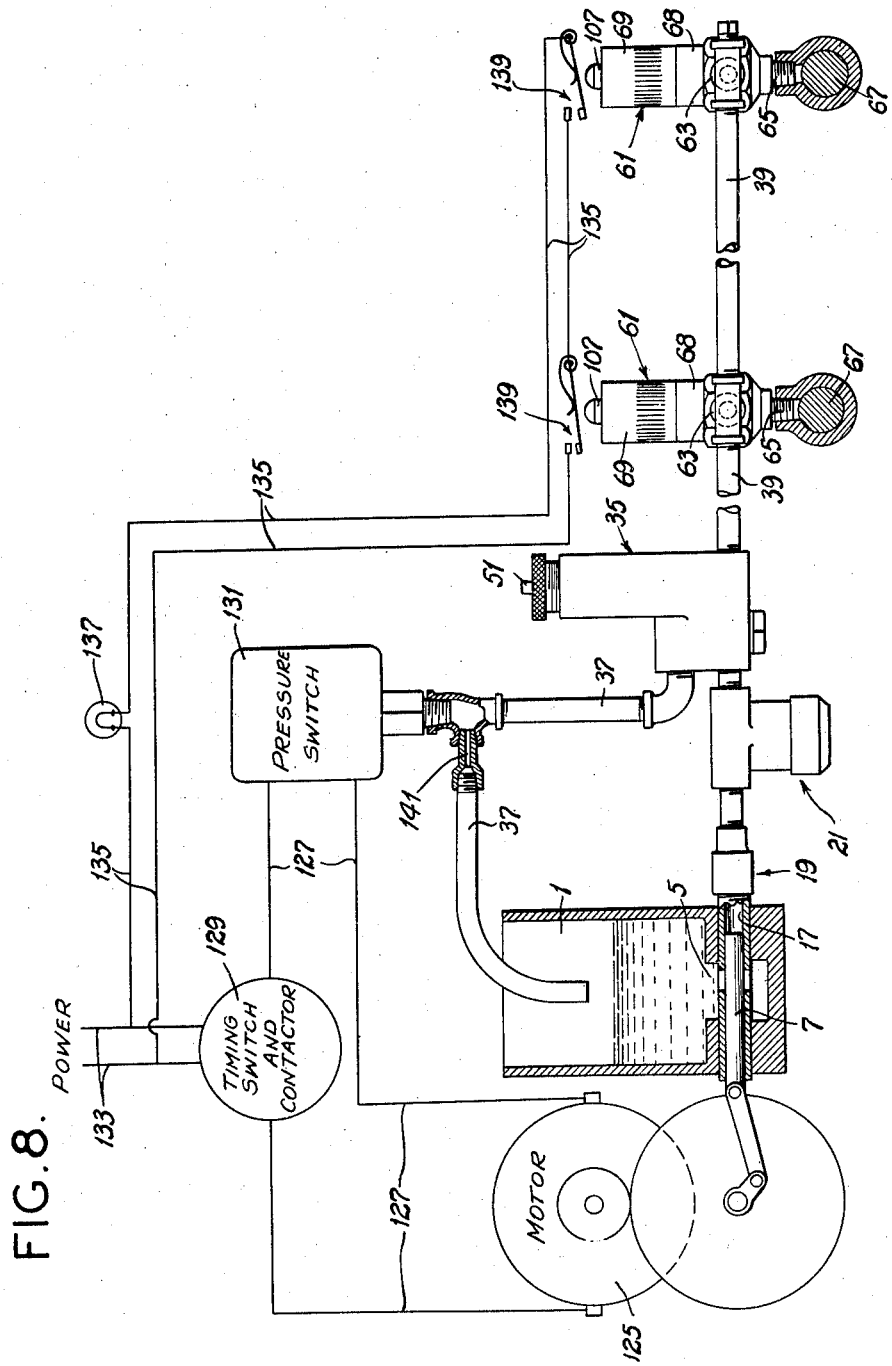
Fig. 8 is a view showing a fully automatic form of the invention.

Referring to said Fig. 8, like numerals designate like parts. In this case the follower 3 is dispensed with, to show that this is possible with certain classes of lubricant. The pump is driven by a motor 125 energized by means of a circuit 127 in which is a timing switch and relay combination 129 and a pressure switch 131. A power circuit 133 energizes the circuit 127. From circuit 133 leads a circuit 135 in which is a series signal lamp 137 and in which are serial contacts 139 normally spring pressed to open position as shown.

The contacts 139 are located just above the tell-tales 107 of injectors such as shown in Fig. 6, so that when the tell-tales move upwardly, as is the case when dispensing occurs, the contacts 139 close. When all contacts 139 have closed, the auxiliary circuit 135 is closed and the signal lamp 137 provides a signal that all injectors are operating.

The relief valve 35 again relieves through the by-pass 37 to the container 1, but in this by-pass (beyond its connection with pressure switch 131)

is a constriction 141 which, when the valve 35 relieves pressure into the by-pass, momentarily prevents said pressure from being dissipated to the container 1. This causes a momentary surge of pressure to the pressure switch 131.

The organization of the pressure switch 131, motor 125 and timing switch and contactor 129 is the same as the organization of the equivalent parts in the United States patent of Alexander P. Fox and Foster Holmes, Number 2,019,299, dated October 29, 1935. That is, normally the motor is not running because the contacts which are associated with the timing switch 129 are open. After a period the contacts are closed in circuit 127 to initiate operation of the motor 125. This portion of the circuit in the pressure switch is at this time closed. As soon as a surge occurs through the by-pass 37, the pressure switch opens the circuit, and once it is opened, a contactor associated with switch 129 holds it open permanently until the timing switch 129 recloses it. Thus the motor is shut off by the surge in the by-pass 37, until such time as the timing switch initiates circuit reclosure.

It is believed unnecessary to further describe the details of this electrical system associated with the circuit 127 in view of the showing in said patent. It will be seen however that the patent does not disclose anything corresponding to the circuit 135.

In Fig. 9 is shown how a system may be organized from injectors 61, pipe 39, relief valve 35 and a strainer 21. This system is permanently attached to the machine to be lubricated and at its inlet is provided a fitting 4 and on the relief line 37 a fitting 6. Couplers 8 and 10 are adapted to be temporarily engaged with and sealed to the fittings 4 and 6 respectively. The couplers 8 and 10 are on the ends of lines 12 and 14 respectively. The line 12 is an outlet line and in the same is a hand-operable valve 16. The lubricant supply tank and the compressor, together with the motor drive or the like, are on a portable carriage 18. The operation of the hand valve 16 is adapted to initiate starting of the motor 20 which drives the compressor 22 on the carriage 18. Such self-starting apparatus is shown, for example, in the United States patent of F. S. Barks, Number 1,902,750, dated March 21, 1933.

For example, in a shop, the respective machines may be piped with their proper injectors 61, relief valve 35, strainer 21 and with two fittings 4 and 6. Then an operator merely goes from machine to machine with the portable outfit having the connectors 8 and 10 and makes the respective connections. Then by opening the valve 16 he automatically obtains a measured charge to each bearing and no more. By watching the tell-tale 51 the operator can tell when the lubricating operation is over.

Figure 10:
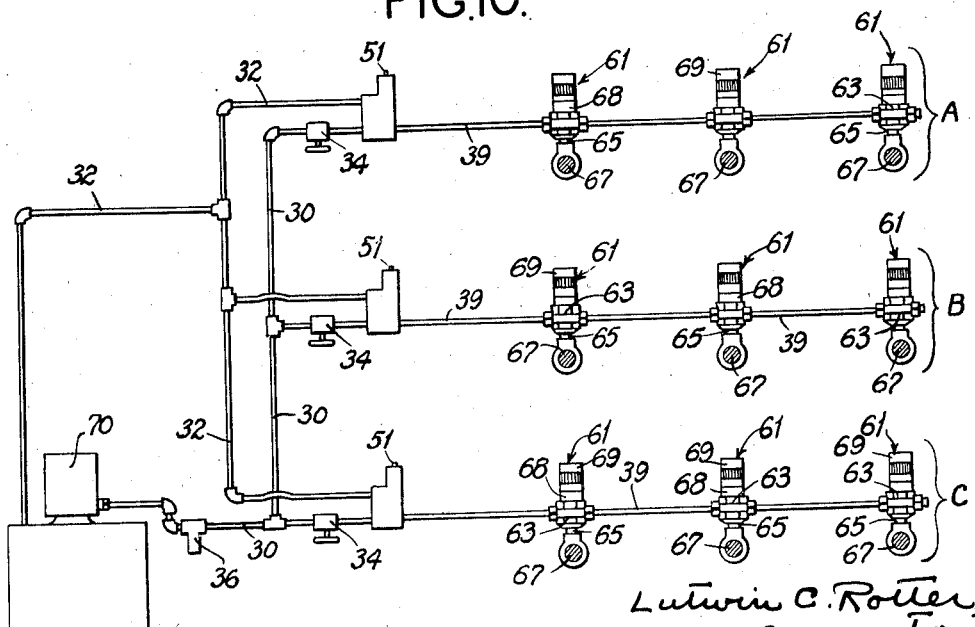

Another adaptation of the invention is shown in Fig. 10 wherein a plurality of the organized systems of injectors, pipes, and relief valves are connected with a single inlet line 30 and a single relief line 32. Cut-off valves 34 are used between the inlet lines 30 and the respective lines 39. The strainer 36 is used in association with the inlet line 30.

In this case the inlet line 30 may be fed from a pump such as shown at numeral 70 used in association with a barrel 40 or other supply compartment for lubricant. The by-pass line or return line 32 returns to said barrel. The type of pump intended for the pump 70 is shown, for example, in Patent 1,963,783, dated June 19, 1934.

In the arrangement shown in Fig. 10, the pump 70 becomes operative automatically as soon as the pressure in the outlet line decreases, as by opening one of the valves 34. It continues to operate until said pressure increases beyond a predetermined point which is set above any of the pressure values hereinbefore mentioned, which will occur if the valve 34 be shut off. By this means, pressure is available at all times in the inlet line 30, and in order to lubricate all bearings of a particular machine with a measured quantity, it is only necessary to open the respective valves 34 associated therewith. In Fig. 10 the respective machines are designated A, B and C.

Among the advantages of the invention will be seen the fact that there is only a single line associated with the plurality of injectors on a given machine, and that no one injector blocks the operation of any other injector, should said one injector become incapacitated. This is because the injectors are connected in parallel to the line 39 and not in series.

The system is simple to set up. For example, a stock house needs only to carry a supply of the injectors, relief valves and strainers, together with the proper pumps, suitable piping and fittings. Thereafter it is merely a matter of piping the apparatus to any machine, as desired. The piping may be of copper tubing type, such as shown in Fig. 1. In this case, the tubing may be bent around to suit conditions of installation. Or, iron pipe may be used (as shown in Fig. 8) for more elaborate and higher pressure installations with which threaded connections may be made to heavier fittings.

It will be understood that the class of injectors shown in Fig. 6 can be used in connection with the manual apparatus shown in Fig. 1, and that in such case, the circuit 135 of Fig. 8 may be used to give a signal whenever all of the lubricating operations have been performed at the respective injectors.

The terms "piston" and "cylinder" are used herein to generically designate any differentially chambered means. For example, a diaphragm in a casing presenting different areas to pressure on opposite sides would constitute a full equivalent to the piston 77 and the cylinder 69.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A lubricant injector comprising a body means having an inlet for receiving lubricant under pressure, and an outlet for delivering lubricant under pressure, a chamber, a differential movable dividing means in the chamber having differential areas presented to pressures on opposite sides thereof, said body means having a passage which always communicates pressure from said inlet to the small side of said diaphragm and having passages associated therewith communicating the area on the large side of said dividing means with said inlet or said outlet, a valve traversing said last-named passages, means normally biasing said valve to one position, said valve presenting an area to the inlet pressure whereby when said pressure rises above a predetermined value said valve is forced against its biasing means to another position, said valve in said positions alternatively connecting the large side of said diaphragm with the inlet and the outlet.

2. A lubricant injector comprising a body having an inlet for receiving lubricant under pressure, and an outlet for delivering lubricant under pressure, a cylinder having differential bores, a differential piston having differential areas presented to pressures in said bores, said body having a passage which always communicates pressure from said inlet to the small end of said piston, and said body having passages associated therewith communicating the area on the large end of said piston with said inlet or said outlet, a valve traversing said last-named passages, means normally biasing said valve to effect communication between the inlet and the large end of the piston, said valve presenting an area to the inlet pressure whereby when said pressure rises above a predetermined value said valve is forced against its biasing means to close said communication between the inlet and the large end of said piston and to open the communication between said large end of said piston and the outlet.

3. A lubricant injector comprising a body having an inlet for receiving lubricant under pressure and an outlet for delivering lubricant under pressure, a cylinder having differential bores, a differential piston having differential areas presented to pressures in said bores, said body having a passage which always communicates pressure from said inlet to the small end of said piston, said body having passages associated therewith communicating the area on the large end of said piston with said inlet or said outlet, a valve traversing said last-named passages, a spring normally biasing said valve to effect communication between the inlet and the large end of the piston, said valve presenting an area to the inlet pressure area whereby when said pressure rises above a predetermined value said valve is forced against its biasing spring to close said communication between the inlet and the large end of said piston and to open the communication between said large end of said piston and the outlet, at least a part of said passage which communicates with the large end of the piston comprising a tubular member passing through said piston and upon which the piston is slidable.

4. An injector comprising a body having a pressure inlet and a pressure outlet, a differential cylinder having a communication with said pressure inlet, a differential piston in said cylinder having opposite large and small end areas, the small end area being at all times exposed to pressure from said inlet, means forming a passage communicating with the large end area of said piston, said last-named communication having passage to said inlet and a second passage to said outlet, a valve, biasing means for the valve, said valve being forced by said biasing means to open said passage to the inlet and to close the passage to the outlet when the pressure in the inlet is of one value and vice versa when the pressure in the inlet is of another higher value to force the valve against its biasing means.

5. An injector comprising a body having a pressure inlet and a pressure outlet, a differential cylinder having a communication with said pressure inlet, a differential piston in said cylinder having opposite large and small end areas, the small end area being at all times exposed to pressure from said inlet, means forming a passage communicating with the large end area of said piston, said last-named communication having a communication with said inlet and a second communication with said outlet, a valve, biasing means for the valve, said valve being forced by said biasing means to open the last-named communication to the inlet and to close the communication to the outlet when the pressure in the inlet is of one value and vice versa when the pressure in the inlet is of another higher value to force the valve against its biasing means, and tell-tale means associated with said valve to indicate its position.

6. An injector comprising a body having a pressure inlet and a pressure outlet, a differential cylinder having a communication with said pressure inlet, a differential piston in said cylinder having opposite large and small end areas, the small end area being at all times exposed to pressure from said inlet, means forming a passage communicating with the large end area of said piston, said last-named communication having a communication with said inlet and a second communication with said outlet, a valve, biasing means for the valve, said valve being forced by said biasing means to open the last-named communication to the inlet and to close the communication to the outlet when the pressure in the inlet is of one value and vice versa when the pressure in the inlet is of another higher value to force the valve against its biasing means, signal means associated with said valve to indicate its position, and signal means associated with said piston to indicate its position.

7. An injector comprising a body having a pressure inlet and a pressure outlet, a differential cylinder having a communication with said pressure inlet, a differential piston in said cylinder having opposite large and small end areas, the small end area being at all times exposed to pressure from said inlet, means forming a passage communicating with the large end area of said piston, said last-named communication having a passage to said inlet and a second passage to said outlet, a valve, biasing means for the valve, said valve being forced by said biasing means to open the communication to the inlet and to close the communication to the outlet when the pressure in the inlet is of one value and vice versa when the pressure in the inlet is of another higher value to force the valve against its biasing means, and signal means associated with said piston and extending from the cylinder.

8. An injector comprising a body having a pressure inlet and a pressure outlet, a differential cylinder having a communication with said pressure inlet, a differential piston in said cylinder having opposite large and small end areas, the small end area being at all times exposed to pressure from said inlet, means forming a passage communicating with the large end area of said piston, said last-named communication having a passage to said inlet and a second passage to said outlet, a valve adapted to open the passage to the inlet and to close the communication to the outlet when the pressure in the inlet is of one value and vice versa when the pressure in the inlet is of another higher value, said cylinder being slotted at a region not traversed by the end areas of the piston, means extending from the piston through said slots, and means around the cylinder adapted to be adjusted to limit the motion to form an abutment for said extending means and to limit the motion of the piston to predetermine a delivered charge.

9. An injector comprising a body having a pressure inlet and a pressure outlet, a differential cylinder associated with said body portion and having a permanent communication with said pressure inlet, a differential piston in said cylinder having its small end exposed to pressure from said communication, a tubular member extending from said body and axially through said piston and being in communication with the large end of said piston, the end of said tubular member in the body portion having a passage connecting with said inlet and a passage connecting with said outlet, a valve traversing said passages and having an area exposed to the pressure in said inlet, said valve having means adapted exclusively to open one or the other of said passages depending upon the valve position, a spring biasing said valve against the pressure on its end area to open the passage to said inlet when the pressure in the inlet is relatively low, but said spring being adapted to be overcome by the pressure when it is relatively high to move the valve to open the passage to the outlet.

10. An injector comprising a body having a pressure inlet and a pressure outlet, a differential cylinder associated with said body portion and having a permanent communication with said pressure inlet, a differential piston in said cylinder having its small end exposed to pressure from said communication, a tubular member extending from said body and axially through said piston and being in communication with the large end of said piston, the end of said tubular member in the body portion having a passage connecting with said inlet and a passage connecting with said outlet, a valve traversing said passages and having an end area exposed to the pressure in said inlet, said valve having means adapted exclusively to open one or the other of said passages depending upon the valve position, a spring biasing said valve against the pressure on its end area to open the passage to said inlet and close the passage to the outlet when the pressure in the inlet is relatively low, but said spring being adapted to be overcome by the pressure when it is relatively high to move the valve to open the passage to the outlet and close the passage to the inlet.

11. An injector comprising a body having an inlet for receiving fluid under pressure and having an outlet for delivering fluid under pressure and a chamber, a movable dividing means in the chamber having areas presented to pressure on opposite sides thereof, said body including a passage between said inlet and one side of the dividing means and a port communicating between the outlet and the other side of the dividing means, said port having a branch port communicating with said inlet, said body having a valve cylinder traversing said branch and outlet ports, a valve which in all positions closely fits said valve cylinder and traverses said branch and outlet ports, biasing means for the valve normally biasing said valve to one position in which inlet pressure is provided on both sides of said dividing means, said valve means presenting an area to pressure of the inlet whereby when said pressure rises the valve means is moved against said biasing means to a position to connect said outlet with one side of said dividing means, the side of said dividing means which is communicable with said outlet being larger in its area than the side which communicates with said inlet.

12. An injector comprising a body having an inlet for receiving fluid under pressure and having an outlet for delivering fluid under pressure and a chamber, a movable dividing means in the chamber having areas presented to pressure on opposite sides thereof, said body including a passage between said inlet and one side of the dividing means and a port communicating between the outlet and the other side of the dividing means, said port having a branch port communicating with said inlet, said body having a valve cylinder traversing said branch and outlet ports, a valve which in all positions closely fits said cylinder and traverses said outlet and branch ports, biasing means for the valve normally biasing said valve to positively cut off the outlet port when said branch port is open and vice versa, said valve closely fitting said cylinder and preventing during all stages any opening of both of said ports at the same time, said valve means presenting an area to pressure of the inlet whereby when said pressure rises the valve means is moved against said biasing means to a position to connect said outlet with one side of said dividing means.

13. An injector comprising a body having an inlet for receiving fluid under pressure and having an outlet for delivering fluid under pressure and a chamber, a movable dividing means in the chamber having areas presented to pressure on opposite sides thereof, said body including a passage between said inlet and one side of the dividing means and a port communicating between the outlet and the other side of the dividing means, said body having a valve cylinder traversing said outlet port, a valve means closely fitting the cylinder and traversing said port, biasing means for the valve normally biasing said valve to a position in which the outlet is cut off, said valve means presenting an area to pressure of the inlet whereby when said pressure rises the valve means is moved against said biasing means to a position to form an exclusive communication between one side of the dividing means and said outlet and under the latter conditions permitting flow from the inlet to the other side of said dividing means, said valve means being adapted by said fit to positively block flow from the inlet to the outlet during all the period in which said outlet communicates with its respective side of said dividing means.

14. An injector comprising a cylinder, a movable dividing means therein, said cylinder having an inlet on one side of the dividing means, outlet means leading from the other side of the dividing means, said outlet means comprising a stationary tube through the dividing means on which the dividing means slides, and an adjustable abutment for said movable dividing means adapted to permit flow through said stationary tube in any position of the abutment.

LUTWIN C. ROTTER.